US012119200B2

(12) United States Patent
Torai

(10) Patent No.: US 12,119,200 B2
(45) Date of Patent: Oct. 15, 2024

(54) INDUSTRIAL MAGNETRON

(71) Applicant: Hitachi Power Solutions Co., Ltd., Ibaraki (JP)

(72) Inventor: Reiji Torai, Ibaraki (JP)

(73) Assignee: HITACHI POWER SOLUTIONS CO., LTD., Ibaraki (JP)

( * ) Notice: Subject to any disclaimer, the term of this patent is extended or adjusted under 35 U.S.C. 154(b) by 0 days.

(21) Appl. No.: 18/407,674

(22) Filed: Jan. 9, 2024

(65) Prior Publication Data

US 2024/0242914 A1 Jul. 18, 2024

(30) Foreign Application Priority Data

Jan. 13, 2023 (JP) ................................ 2023-004066

(51) Int. Cl.
*H01J 23/00* (2006.01)
*H01J 23/02* (2006.01)
*H01J 25/50* (2006.01)

(52) U.S. Cl.
CPC ............ *H01J 23/005* (2013.01); *H01J 23/02* (2013.01); *H01J 25/50* (2013.01)

(58) Field of Classification Search
CPC .......... H01J 23/005; H01J 23/02; H01J 25/50; H01J 25/587
See application file for complete search history.

(56) References Cited

U.S. PATENT DOCUMENTS

2022/0275975 A1 9/2022 Torai

FOREIGN PATENT DOCUMENTS

JP 2003100224 A * 4/2003 ............. H01J 23/00
JP 6992206 B1 1/2022

OTHER PUBLICATIONS

English Machine Translation of Ochiai Japanese Pub. No. JP 2003100224 (Year: 2024).*

* cited by examiner

*Primary Examiner* — Donald L Raleigh
(74) *Attorney, Agent, or Firm* — MATTINGLY & MALUR, PC

(57) ABSTRACT

An industrial magnetron includes an anode cylinder body and a cooling block arranged in a columnar manner around an outer periphery of the anode cylinder body, where the cooling block is provided with a refrigerant flow path that circulates a liquid refrigerant to circulate around the anode cylinder body and directly cool the anode cylinder body, and the refrigerant flow path has a helical groove on an inner wall surface.

9 Claims, 13 Drawing Sheets

INDUSTRIAL MAGNETRON

CROSS-REFERENCE TO RELATED APPLICATION

The present application claims priority from Japanese application JP2023-004066, filed on Jan. 13, 2023, the content of which is hereby incorporated by reference into this application.

BACKGROUND OF THE INVENTION

1. Field of the Invention

The present invention relates to a high output type industrial magnetron.

2. Description of Related Art

In general, industrial magnetrons are widely used in fields such as radar equipment, medical equipment, cooking appliances such as microwave ovens, semiconductor manufacturing equipment, and other microwave application equipment because the industrial magnetrons can efficiently generate high-frequency output. High-power microwaves are required for semiconductor devices and industrial heating.

A magnetron consists of a high voltage DC power supply that generates a high voltage to be applied between a cathode and an anode, a power source that heats a filament to a specified temperature to emit electrons, a control circuit for the power supply and the power source, a waveguide for extracting microwave energy, a housing that accommodates such components, and the like.

A magnetron consists of a cathode placed in a center of an anode cylinder body (anode), and a magnet, where a heater is wound around the cathode, and by applying a predetermined current thereto, thermionic electrons are emitted from the cathode. Although thermionic electrons are attracted to the anode cylinder body side, the thermionic electrons rotate around the cathode due to a magnetic field formed by the magnet, and the magnetron causes the vibration to resonate in a cavity provided on the anode side, and extracts the energy as radio waves (microwaves) from an output portion (antenna).

However, some of the thermionic electrons collide with the anode cylinder body, and the energy is converted into heat, generating heat. Continuing heat generation leads to deterioration of magnet performance and further damage to the anode cylinder body.

Magnetrons with low outputs, such as those used in household microwave ovens, have a low heat generation amount, so such magnetrons can be cooled by air cooling. However, for industrial magnetrons with large outputs, air cooling cannot be used, and a liquid medium such as water must be used for cooling.

One method is to install refrigerant pipes around a cooling block and supply liquid refrigerant. As another method, when it is necessary to further increase a cooling capacity, there is a method of forcibly cooling the anode cylinder body using a cooling block disposed around the anode cylinder body to reduce heat generation. Specifically, a refrigerant flow path is provided in the cooling block to circulate around the anode cylinder body, and the liquid refrigerant flows through the cooling block to directly cool the anode cylinder body.

JP6992206B describes an industrial magnetron in which a cylindrical refrigerant flow path is provided in a cooling block to circulate around an anode cylinder body, and a liquid refrigerant is caused to flow through the refrigerant flow path to directly cool the anode cylinder body.

The industrial magnetron described in JP6992206B can be sufficiently cooled when the amount of heat generated by the anode cylinder body is not so large. However, as the amount of heat generated by the anode cylinder body further increases, the amount of heat exceeds the cooling capacity, and it has been found that it is difficult to cool the anode cylinder body sufficiently.

The present invention is made in view of such circumstances, and an object of the present invention is to provide an industrial magnetron that can be sufficiently cooled even when the amount of heat generated by the anode cylinder body increases, thereby preventing performance degradation and failure of the anode cylinder body.

SUMMARY OF THE INVENTION

To solve the above problem, an industrial magnetron of the present invention includes an anode cylinder body and a cooling block arranged in a columnar manner around an outer periphery of the anode cylinder body, in which the cooling block is provided with a refrigerant flow path that circulates a liquid refrigerant to circulate around the anode cylinder body and directly cool the anode cylinder body, the refrigerant flow path has a helical groove on an inner wall surface, and in a sample product manufacturing stage prior to actual production, a test operation is performed to specify a heat generation position of the anode cylinder body and measure a heat generation amount, and then pitch, inner diameter, and nominal diameter of the helical groove, an arrangement position of the refrigerant flow path, and the number of turns of the refrigerant flow path are set according to the heat generation position and the heat generation amount.

According to the present invention, it is possible to provide an industrial magnetron that can be sufficiently cooled even when the amount of heat generated by the anode cylinder body increases, thereby preventing performance deterioration and failure of the anode cylinder body.

DESCRIPTION OF EMBODIMENTS

Embodiments of the present invention will be described in detail below with reference to the drawings.

First Embodiment

Figure 1A:
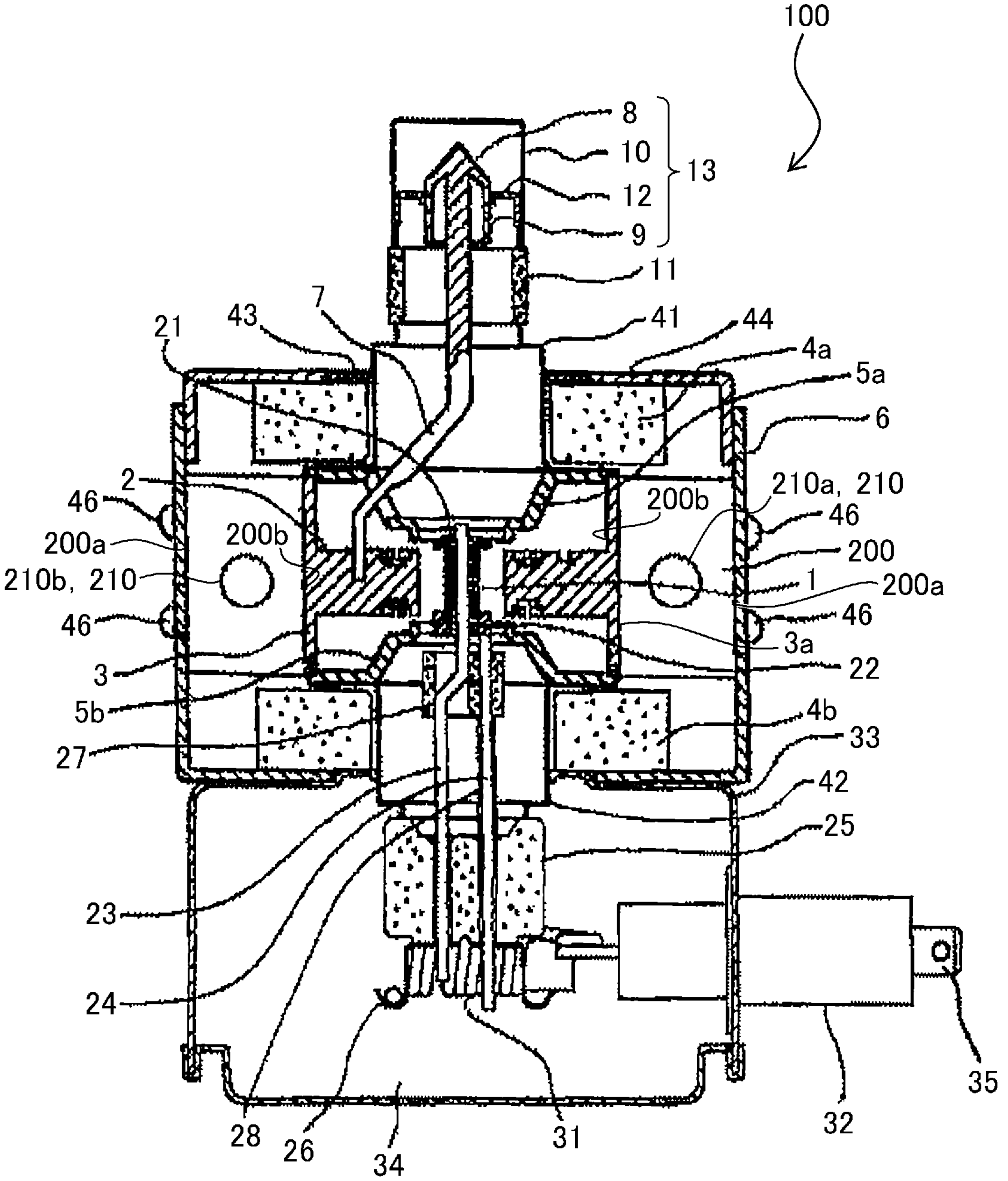
FIG. 1A is a longitudinal cross-sectional view illustrating a configuration of an industrial magnetron according to a first embodiment of the present invention.
Figure 1B:
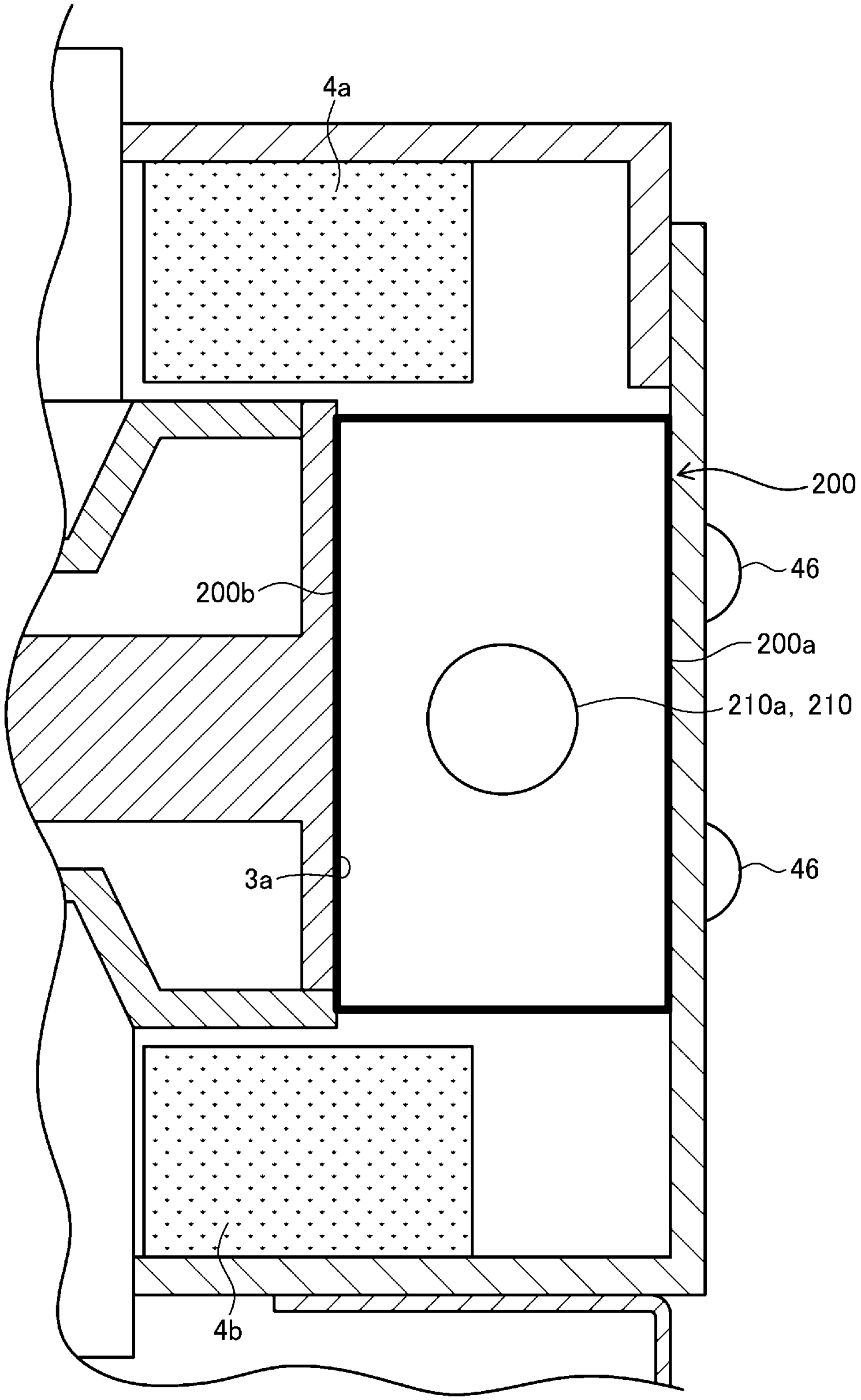
FIG. 1B is an enlarged view of a main part of FIG. 1A.

FIG. 1A is a longitudinal cross-sectional view illustrating a configuration of an industrial magnetron according to a first embodiment of the present invention. FIG. 1B is an enlarged view of a main part of FIG. 1A. The embodiment is an example in which the present invention is applied to an industrial magnetron equipped with a refrigerant flow path that circulates around an anode cylinder body only once.

Overall Structure

As illustrated in FIG. 1A, an industrial magnetron 100 includes a low output type with an output of about 2 kW and a high output type with an output of about 15 kW. When the industrial magnetron 100 is a low output type, sufficient cooling can be achieved even if the refrigerant circulates once around a refrigerant flow path.

The industrial magnetron 100 includes a cathode filament 1 formed in a helical shape as a heat emission source, a plurality of anode vanes 2 arranged around the cathode filament 1, an anode cylinder body 3 (anode cylinder) supporting the anode vane 2, and a pair of annular permanent magnets 4*a* and 4*b* arranged at upper and lower ends of the anode cylinder 3. The anode vane 2 and the anode cylinder body 3 are integrated by fixing such as brazing or by extrusion molding, and form a part of an anode portion.

"Circulating" means "to go around something, to go around there, around it, or surroundings". In the specification, as in FIG. 1A, even when a refrigerant flow path 210 does not rotate around the anode cylinder body 3 by 360 degrees, since the refrigerant flow path 210 circulates around the anode cylinder body 3, the aspect as illustrated in FIG. 1A is also referred to as circulating (circulating around the anode cylinder body). Incidentally, in the example of FIG. 1A, the number of turns is one, and in the example of FIG. 8, which will be described below, the number of turns is three, since the loop is bent at two places.

The plurality of anode vanes 2 are arranged radially around the cathode filament 1. An operating space is formed between the cathode filament 1 and the anode vane 2. A region surrounded by two adjacent anode vanes 2 and the anode cylinder 3 is a resonant cavity.

A pair of magnetic poles 5*a* and 5*b* made of a ferromagnetic material such as soft iron is arranged between the anode cylinder body 3 and the permanent magnets 4*a* and 4*b*, respectively.

An antenna lead 7 is electrically connected to the anode vane 2. The other end of the antenna lead 7 is sealed together with an exhaust pipe 8. The antenna lead 7 and the exhaust pipe 8 are electrically connected. The exhaust pipe 8 forms a magnetron antenna 13 together with a choke portion 9, an antenna cover 10, and an exhaust pipe support 12. The magnetron antenna 13 is supported by a cylindrical insulating body 11.

The cathode filament 1 is connected to a center lead 23 and a side lead 24, which are cathode leads. An upper end shield 21, a lower end shield 22, an input ceramic 25, a cathode terminal 26, and a spacer 27 are arranged around the cathode filament 1. The spacer 27 has a function of preventing the cathode filament 1 from breaking. The spacer 27 is fixed in place by a sleeve 28. Such parts form a cathode portion. The vane 2 is arranged around the cathode portion.

A choke coil 31 is connected to one end of a feedthrough capacitor 32. The feedthrough capacitor 32 is attached to a filter case 33 at an input portion. A cathode heating conducting wire 35 is provided at the other end of the feedthrough capacitor 32, and feedthrough capacitor 32 is connected to a power source via the wire.

A bottom of the filter case 33 is covered by a lid 34 in terms of high frequency. Upper and lower end sealing metals 41 and 42 having cap shapes and a metal gasket 43 are electrically connected to an upper yoke 44.

The industrial magnetron 100 includes a cathode placed in a center of the anode cylinder body (anode), and a magnet. A heater is wound around the cathode, and by applying a predetermined current thereto, thermionic electrons are emitted from the cathode. Thermionic electrons are attracted to the anode cylindrical side, but due to the magnetic field formed by the magnet, the thermionic electrons circulate around the cathode rotationally. Then, the vibration is caused to resonate in a cavity provided on the anode side, and the energy is extracted from the output portion (antenna) as radio waves (microwaves).

The industrial magnetron 100 includes the anode cylinder body 3, the permanent magnets 4*a* and 4*b* having an annular shape and arranged above and below the anode cylinder body 3 to supply a magnetic field, and a cooling block 200 arranged in a columnar manner around an outer periphery of the anode cylinder body 3.

The embodiment further improves a structure of directly cooling the anode cylinder body by providing the refrigerant flow path 210 in the cooling block 200. In the specification, direct cooling refers to cooling by flowing a refrigerant around the anode cylinder body at a predetermined distance.

Cooling Block 200

The cooling block 200 has an outer wall portion 200*a* of a cooling block body, and an inner wall surface 200*b* that is closely in contact with a side wall surface 3*a* of the anode cylinder body 3 at a center of the cooling block.

Specifically, as illustrated in FIG. 1B, the cooling block 200 has the outer wall portion 200*a* of the cooling block body, and the inner wall surface 200*b* that is a contact portion of the cooling block 200 with the anode cylinder body. The inner wall surface 200*b* of the cooling block 200 is a cylindrical portion that is in close contact with the side wall surface 3*a* of the anode cylindrical body 3.

The cooling block 200 is provided with the refrigerant passage 210 through which a liquid refrigerant circulates around the anode cylinder body 3 and directly cools the anode cylinder body 3.

The cooling block 200 has the refrigerant flow path 210 that circulates around the anode cylinder body 3 at least once, and adjusts a cooling capacity for the anode cylinder body 3 depending on a position where the refrigerant flow path 210 circulates around.

The inner wall surface 200*b* of the cooling block 200 is disposed in close contact with the side wall surface 3*a* of the anode cylinder body 3.

The cooling block 200 is disposed around an outer periphery of the anode cylinder body 3 of the industrial magnetron 100 and is formed into a columnar shape. The cooling block 200 has a rectangular prism shape in terms of manufacturing and processing.

The cooling block 200 is made of an aluminum material (Al) that has high thermal conductivity and high workability. Inside the cooling block 200, the refrigerant flow path 210 is provided through which a cooling medium (refrigerant) flows. The refrigerant flow path 210 is a cylindrical flow path having a helical groove 220 (see FIG. 2 below) on an inner wall surface. Here, helical refers to something that is coiled like a conch shell, or a spiral groove.

The cooling block 200 is fixed to a yoke 6 with a plurality of mounting screws 46. The cooling block 200 may be made of copper material (Cu) instead of aluminum material.

As the refrigerant, water, particularly pure water or ion-exchanged water is preferably used. The refrigerant may be a coolant (aqueous solution containing ethylene glycol) or the like.

Figure 2:
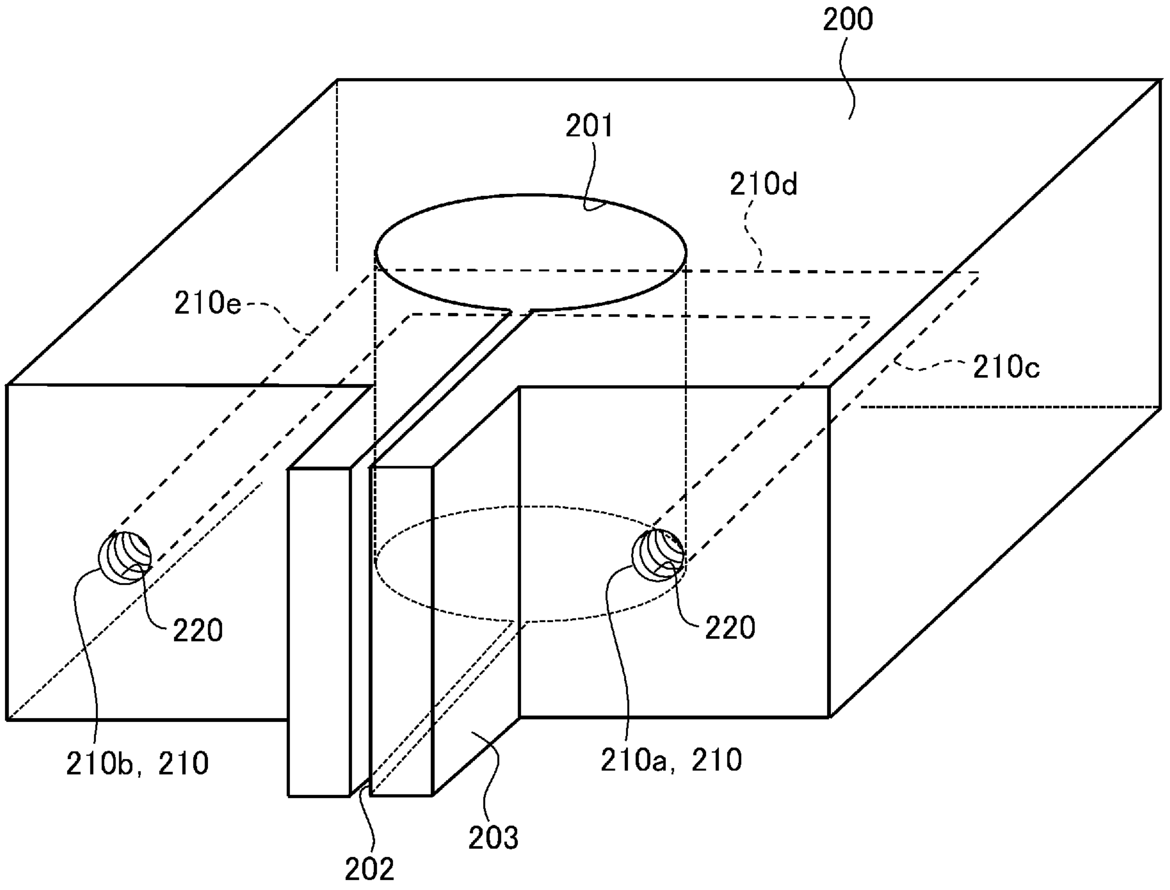
FIG. 2 is a perspective view illustrating a configuration of a cooling block having a single-stage refrigerant flow path that circulates around once around an anode cylinder body of the industrial magnetron according to the first embodiment of the present invention.

FIG. 2 is a perspective view illustrating a configuration of the cooling block 200 having a single-stage refrigerant flow path 210 that circulates around the anode cylinder body once.

As illustrated in FIG. 2, the cooling block 200 is made of a square columnar aluminum material, and has an anode cylindrical body insertion portion 201 (space or through hole) and a slit 202 (*gap*).

Convex portions 203 provided on both sides of the slit 202 are for passing and tightening bolts to bring an outer circumferential wall 3*a* of the anode cylinder body 3 into close contact with the cooling block 200. The cooling block may be manufactured without providing the slit 202 and the convex portions 203.

Although the cooling block 200 may be a columnar body having another cross-sectional shape (for example, circular), a square columnar body is preferable because it is easy to manufacture including processing such as drilling.

In the following description, for convenience, a direction of a central axis of the columnar body, that is, a central axis of the anode cylindrical body insertion portion 201 will be referred to as a "vertical direction". However, this is just a convenient expression, and depending on how the cooling block 200 is installed, the central axis may be horizontal with respect to a direction of gravity or diagonal with respect to the vertical direction.

Refrigerant Flow Path 210

Arrangement of Refrigerant Flow Path 210

The refrigerant flow path 210 circulates the liquid refrigerant to circulate around the anode cylinder body 3 and directly cool the anode cylinder body 3.

The refrigerant flow path 210 is arranged in a U-shape inside the cooling block 200 having a quadrangular columnar shape to circulate around the outer peripheral surface of the anode cylinder body 3.

One end of the refrigerant flow path 210 is an opening, which is used as a connection port 210*a* for connecting to an external refrigerant storage tank (not illustrated), and the other end of the refrigerant flow path 210 is a connection port 210*b*, which is used as a connection port 210*b* for connecting to the refrigerant storage tank. The connection port 210*a* and the connection port 210*b* are provided on the same side surface of the cooling block 200 having a quadrangular columnar shape. In operation, a supply path (not illustrated) for supplying liquid refrigerant from the refrigerant storage tank or the like is connected to an inlet (connection port 210*a*), and a recovery path (not illustrated) for recovering the liquid refrigerant to the refrigerant storage tank or the like is connected to a discharge port (connection port 210*b*).

Structure of Refrigerant Flow Path 210

The refrigerant flow path 210 is a cylindrical flow path with the helical groove 220 on the inner wall surface. Specifically, the refrigerant flow path 210 includes refrigerant flow paths 210*c*, 210*d*, and 210*e* having a helical groove 220 on the inner wall surface, and the connection port 210*a* and the connection port 210*b*.

Since the industrial magnetron 100 has a large output and a large amount of heat generated from the anode cylinder body, it is necessary to enhance the cooling effect of the cooling block 200. The helical groove 220 is provided on the inner wall surface of the refrigerant flow path 210 to enhance the cooling effect.

The method for creating the refrigerant flow path 210*d* among the refrigerant flow paths 210*c*, 210*d*, and 210*e* will be described below.

The refrigerant flow path 210 having the helical groove 220 has two advantages over the refrigerant flow path that does not have a helical groove, that is having a larger refrigerant contact area as a refrigerant supply path (the surface area (heat transfer area) of the inner circumference of the refrigerant flow path 210 increases), and having a longer refrigerant residence time. Another advantage is that the helical groove 220 disturbs the flow of the coolant, thereby increasing heat transfer efficiency. Therefore, the refrigerant flow path 210 having the helical groove 220 can increase the cooling capacity even when the amount of refrigerant supplied per unit time is the same.

Hereinafter, the refrigerant flow path 210 having the helical groove 220 on the inner wall surface will be simply referred to as a refrigerant flow path, and the refrigerant flow path without the helical groove on the inner wall surface will be referred to as a refrigerant flow path of the related art.

Figure 3:
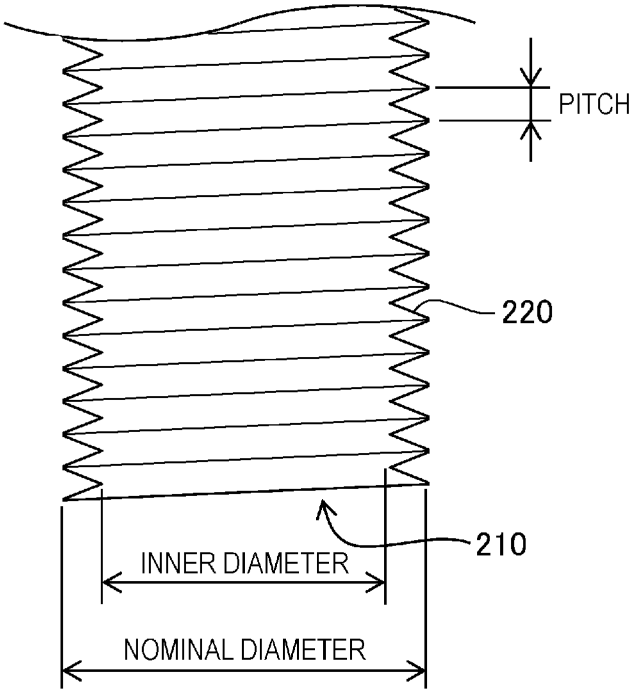
FIG. 3 is a diagram illustrating a structure of a refrigerant flow path having a helical groove on an inner wall surface of the industrial magnetron according to the first embodiment of the present invention.

FIG. 3 is a diagram illustrating a structure of the refrigerant flow path 210 having the helical groove 220 on the inner wall surface.

As illustrated in FIG. 3, the helical groove 220 has a predetermined pitch, inner diameter, and nominal diameter. Regarding the pitch, inner diameter, and nominal diameter of the helical groove, in a sample product manufacturing stage prior to producing the industrial magnetron 100, the industrial magnetron 100 is test-operated to specify a heat generation position of the anode cylinder body 3 and measure a heat generation amount, and settings are made according to the heat generation position and heat generation amount.

The refrigerant flow path 210 having the helical groove 220 illustrated in FIG. 3 is disposed within the cooling block 200 (FIGS. 1A and 2).

In manufacturing, the helical groove 220 is formed by cutting the refrigerant flow path 210 with a drill to form a cylindrical hole, and then performing helical groove processing using a tapping drill (drill for helical groove processing). Alternatively, the helical groove may be drilled directly with a tapping drill to open helical groove.

Figure 4A:
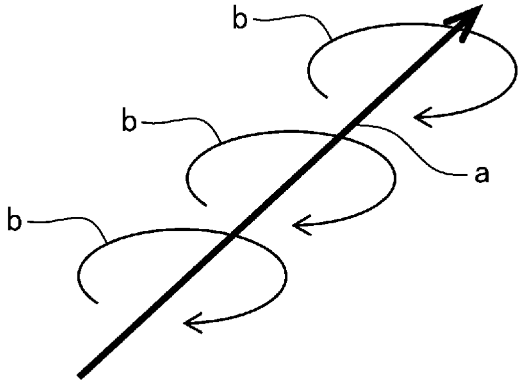
FIG. 4A is a diagram illustrating flow of a liquid medium in the refrigerant flow path of the industrial magnetron according to the first embodiment of the present invention.
Figure 4B:
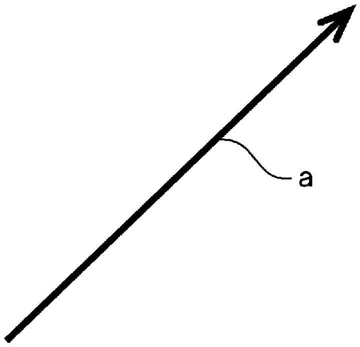
FIG. 4B is a diagram illustrating flow of the liquid medium in the refrigerant flow path of the industrial magnetron according to the first embodiment of the present invention.

FIGS. 4A and 4B are diagrams illustrating a flow of a liquid medium in the refrigerant flow path. FIG. 4A illustrates the flow of the liquid medium in the refrigerant flow path 210, and FIG. 4B illustrates the flow of the liquid medium in the refrigerant flow path of the related art.

As illustrated in FIG. 4A, in the case of the refrigerant flow path 210, the liquid medium flows in a straight line (arrow a in FIG. 4A) and in a spiral manner (arrow b in FIG. 4A).

On the other hand, as illustrated in FIG. 4B, in the case of the refrigerant flow path of the related art, the liquid medium flows in a straight line (arrow a in FIG. 4B).

As such, in the refrigerant flow path 210 of the embodiment, a movement is added in which the liquid medium circulates along the helical groove 220 while swirling. Since the liquid medium flows while swirling along the helical groove 220, the residence time of the refrigerant becomes longer, and even when the amount of refrigerant supplied per unit time is the same, it is possible to increase the cooling capacity.

Comparison of Refrigerant Flow Path 210 and Refrigerant Flow Path of Related Art In the refrigerant flow path of the related art, when drilled, the cross section of the refrigerant flow path is circular, so the effect is small from the perspective of heat transfer area.

On the other hand, although the refrigerant flow path 210 has a circular cross section like the refrigerant flow path of the related art, the refrigerant contact area can be increased by the helical groove 220. In other words, the refrigerant contact can be increased without increasing the cross-sectional area of the refrigerant flow path. The supplied refrigerant flows while swirling along the helical groove 220, thereby increasing the residence time of the refrigerant. Therefore, the refrigerant flow path 210 can increase the cooling capacity even when the amount of refrigerant supplied per unit time is the same.

As another way to increase the cooling effect of the cooling block 200, it is possible to increase the refrigerant flow rate per unit time by further increasing the cross-sectional area of the refrigerant flow path, or to increase the heat transfer area by increasing the number of refrigerant flow paths in a flow path with the same cross-sectional area.

As described above, in the embodiment, since the refrigerant contact area can be increased by the helical groove 220, even with the same cross-sectional area as the refrigerant flow path of the related art, the refrigerant flow rate per unit time can be further increased. In other words, the same effect as increasing the cross-sectional area of the refrigerant flow path can be obtained without increasing the cross-sectional area of the refrigerant flow path.

Since the refrigerant contact surface can be increased to increase the heat transfer area, it is possible to configure the refrigerant flow path without increasing the number of refrigerant flow paths or with a smaller number of refrigerant flow paths.

When the number of refrigerant flow paths is increased, the refrigerant flow rate per unit time per flow path does not change, but the heat transfer area increases in proportion to the number of flow paths. Since the area directly facing the refrigerant flowing near the anode cylinder body 3 becomes larger, the cooling effect can be enhanced.

Adjustment of Refrigerant Capacity of Cooling Block 200

The refrigerant capacity of the cooling block 200 can be adjusted by either one of:

(1) Cross-sectional area of refrigerant flow path, (2) Pitch, inner diameter, and nominal diameter of helical groove, (3) Arrangement position of refrigerant flow path, or (4) Number of turns of refrigerant flow path, or a combination thereof.

The above-described (1) Cross-sectional area of refrigerant flow path, and (2) Pitch, inner diameter, and nominal diameter of helical groove are determined by a tapping drill during drilling.

When the conditions of the tapping drill are not changed, the refrigerant capacity can be adjusted by (3) Arrangement position of refrigerant flow path and (4) Number of turns of the refrigerant flow path. (3) Arrangement position of refrigerant flow path will be described below with reference to FIGS. 6A to 6D. (4) Number of turns of refrigerant flow path will be described below with reference to FIGS. 7 to 10.

Comparison of Refrigerant Capacity of Cooling Block 200

The industrial magnetron 100 (FIG. 1A) is a magnetron in which the anode cylinder body 3 is cooled using the cooling block 200 in which the refrigerant flow path 210 is arranged so that the refrigerant flow path 210 circulates around the anode cylinder body 3 in a U-shape only once, near the center of the anode cylinder body 3.

Figure 5:
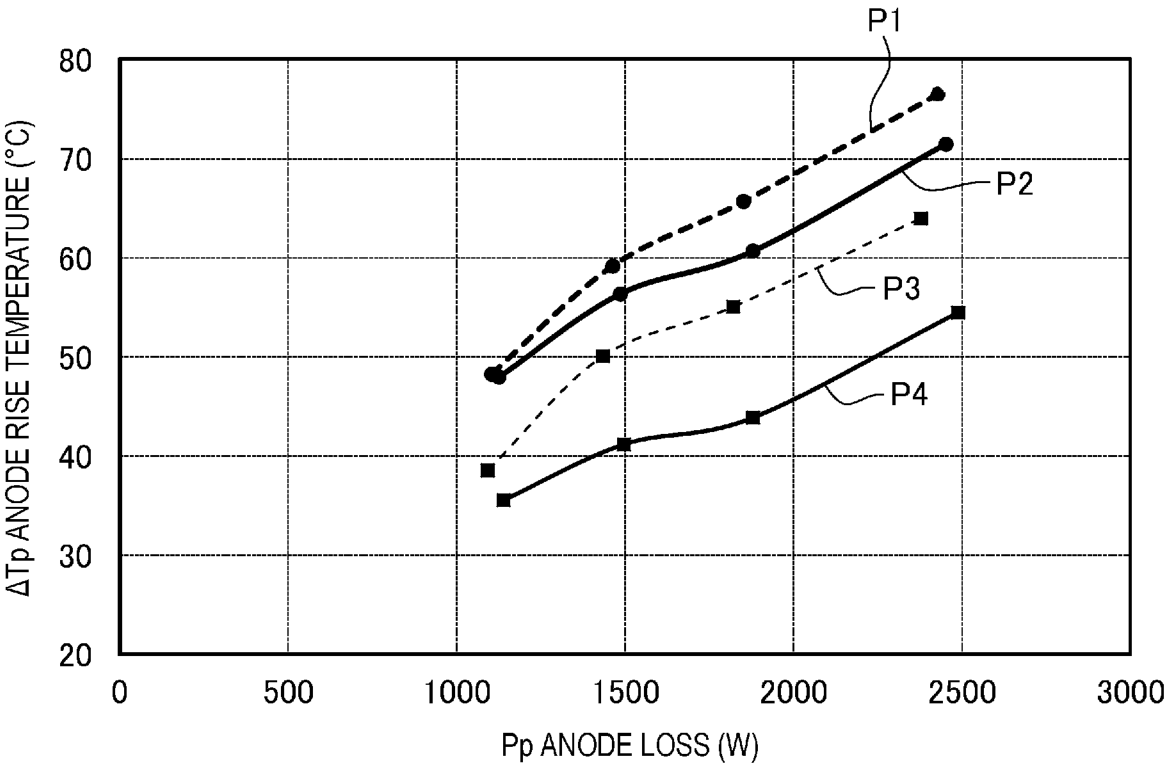
FIG. 5 is a diagram illustrating a comparison of cooling characteristics when an anode cylinder body is cooled using the refrigerant flow path of the industrial magnetron according to the first embodiment of the present invention and cooling capacity when cooling the anode cylinder body using a refrigerant flow path of the related art.

FIG. 5 is a diagram comparing, in an industrial magnetron in which a refrigerant flow path is applied so that the refrigerant flow path circulates around the anode cylinder body in a U-shape only once near the center of the anode cylinder body 3, the cooling characteristics when the anode cylinder body 3 is cooled using the refrigerant flow path 210 (FIG. 1A and FIG. 2) and the cooling capacity when the anode cylinder body is cooled using the refrigerant flow path of the related art. In FIG. 5, the horizontal axis represents anode loss Pp (W), and the vertical axis represents anode rise temperature ΔTp (° C.).

P1: Cooling result using refrigerant flow path without helical groove (liquid refrigerant supplied at 3 l/min)

P2: Cooling result using refrigerant flow path with helical groove (liquid refrigerant supplied at 3 l/min)

P3: Cooling result using refrigerant flow path without helical groove (liquid refrigerant supplied at 5 l/min)

P4: Cooling result using refrigerant flow path with helical groove (liquid refrigerant supplied at 5 l/min)

Both the refrigerant flow path 210 and the refrigerant flow path of the related art circulate around the center of the anode cylinder body only once. The industrial magnetron used as a sample has a power of about 3 kW, about 4 kW, about 5 kw, and about 6 kW in order from the lowest temperature points P4, P3, P2, and P1 on the graph.

As illustrated in the cooling characteristics of FIG. 5, it can be seen that the refrigerant flow path 210 (FIGS. 1A and 2) has a greater cooling capacity than the refrigerant flow path of the related art.

Arrangement of Refrigerant Flow Path that Circulates Around Only Once

It is shown that by arranging the refrigerant flow path 210 to circulate around the part of the anode cylinder body 3 that generates the largest amount of heat, the relative cooling capacity of the refrigerant flow path 210 to the anode cylinder body 3 can be maximized.

FIGS. 6A to 6D are diagrams schematically illustrating the arrangement positions of the refrigerant flow path that circulates only once.

Figure 6A:
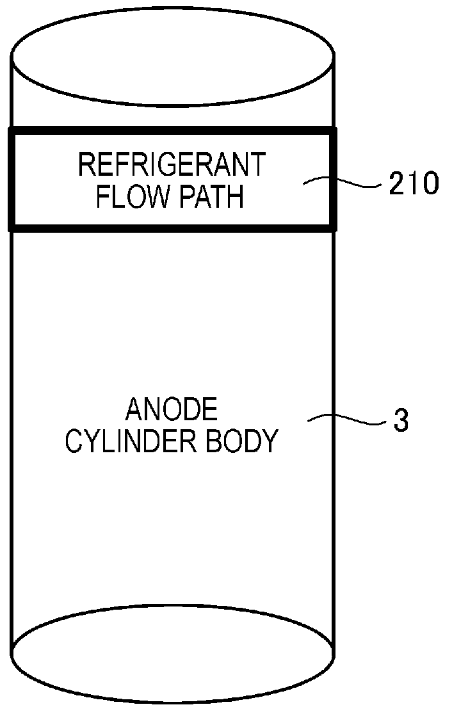
FIG. 6A is a diagram schematically illustrating an arrangement position of the refrigerant flow path of the industrial magnetron according to the first embodiment of the present invention.

In FIG. 6A, the maximum heat generation portion is distributed in an upper part of the anode cylinder body 3, and the refrigerant flow path 210 is made to circulate around the upper part of the anode cylinder body 3.

Figure 6B:
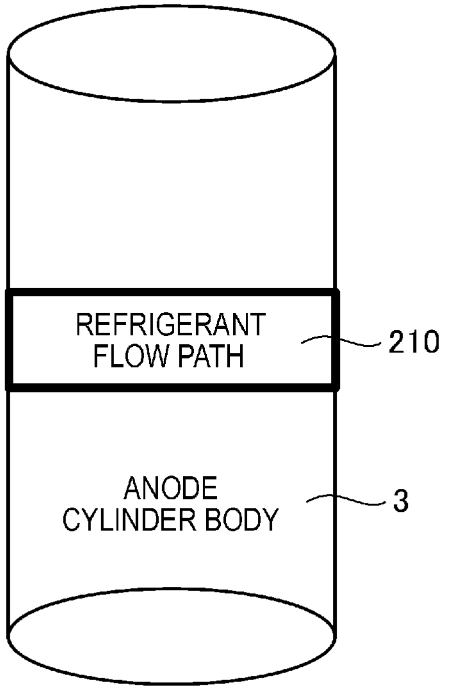
FIG. 6B is a diagram schematically illustrating an arrangement position of the refrigerant flow path of the industrial magnetron according to the first embodiment of the present invention.

In FIG. 6B, the maximum heat generation portion is distributed in a center of the anode cylinder body 3, and the refrigerant flow path 210 is made to circulate around the center of the anode cylinder body 3.

Figure 6C:
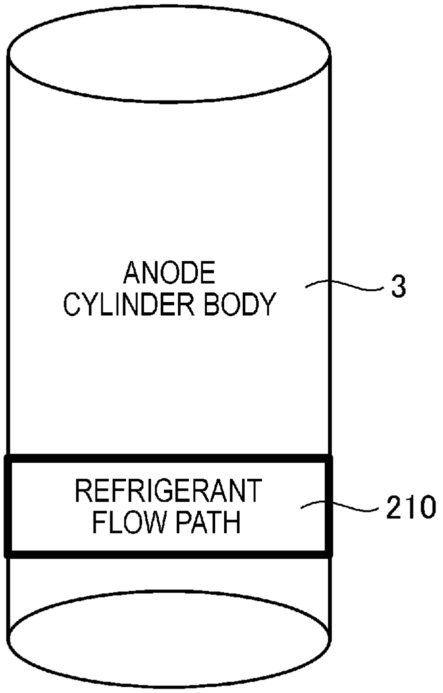
FIG. 6C is a diagram schematically illustrating an arrangement position of the refrigerant flow path of the industrial magnetron according to the first embodiment of the present invention.

In FIG. 6C, the maximum heat generation part is distributed at a lower part of the anode cylinder body 3, and the refrigerant flow path 210 is made to circulate around the lower part of the anode cylinder body 3.

Figure 6D:
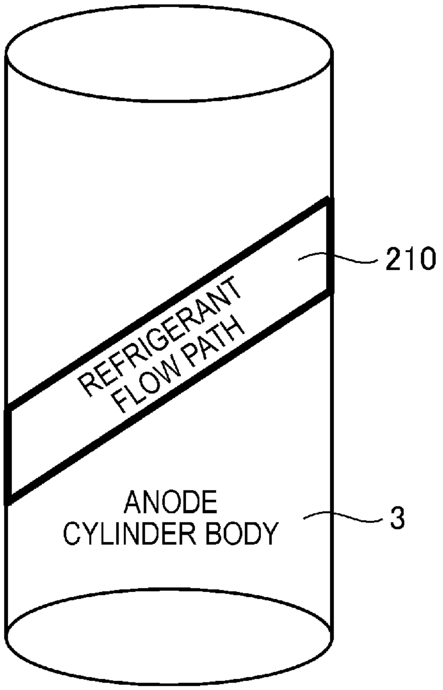
FIG. 6D is a diagram schematically illustrating an arrangement position of the refrigerant flow path of the industrial magnetron according to the first embodiment of the present invention.

In FIG. 6D, the maximum heat generating portion is distributed obliquely in the anode cylinder body 3, and the refrigerant flow path 210 is made to circulate obliquely with respect to the anode cylinder body 3.

As such, the cooling capacity for the anode cylinder body 3 can be adjusted depending on the position of the refrigerant flow path 210 that circulates around the anode cylinder body 3.

Effects of First Embodiment

As described above, the industrial magnetron 100 (FIGS. 1A and 2) according to the first embodiment includes the anode cylinder body 3 and the cooling block 200 arranged in a columnar manner around the outer periphery of the anode cylinder body 3. The cooling block 200 is provided with the refrigerant flow path 210 that circulates a liquid refrigerant to circulate around the anode cylinder body 3 and directly cool the anode cylinder body 3, and the refrigerant flow path 210 has the helical groove 220 on the inner wall surface.

With such configuration, the refrigerant flow path 210 having the helical groove 220 has advantages over the refrigerant flow path of the related art having no helical groove in that the refrigerant contact area as a refrigerant supply path is larger and the residence time of the refrigerant is longer. Therefore, even when the amount of refrigerant supplied per unit time is the same, it is possible to increase the cooling capacity. It is clear from FIG. 5 that the refrigerant flow path 210 has a greater cooling capacity than the refrigerant flow path of the related art. Therefore, even when the amount of heat generated by the anode cylinder body 3 increases, it is possible to sufficiently cool the anode cylinder body 3 and prevent performance deterioration and failure of the anode cylinder body. As a result, it is possible to provide an industrial magnetron that suppresses the effects of heat generation even when operated in a high output range of 2 kW to 15 kW.

In the industrial magnetron 100 (FIG. 1A, FIG. 2) according to the first embodiment, the cooling block 200 has the refrigerant flow path 210 that circulates around the anode cylinder body 3 at least once, and adjusts the cooling capacity for the anode cylinder body 3 depending on the position where the refrigerant flow path 210 circulates around.

At the sample manufacturing stage before the actual production of industrial magnetron 100, the industrial magnetron 100 is test-operated to specify the heat generation position of the anode cylinder body 3 and measure the heat generation amount, and then the pitch, inner diameter, and nominal diameter of the helical groove 220, the arrangement position of the refrigerant flow path 210, and the number of turns of the refrigerant flow path 210 are set according to the heat generation position and the heat generation amount.

Accordingly, the cooling capacity for the anode cylinder body 3 can be adjusted by the arrangement position of the refrigerant flow path that circulates around the anode cylinder body 3 and the number of turns of the refrigerant flow path 210. In other words, no matter what kind of output the industrial magnetron has, in the sample product manufacturing stage before the actual production of the industrial magnetron 100, the industrial magnetron 100 is test-operated to specify the heat generation position of the anode cylinder body 3 and measure the heat generation amount, and then the pitch, inner diameter, and nominal diameter of the helical groove 220 and the arrangement position of the refrigerant flow path 210 are set according to the heat generation position and the heat generation amount. Therefore, it is possible to cope with future output changes, changes in application conditions, and replacements, and thus versatility can be greatly improved.

Second Embodiment

The configuration of the refrigerant flow path will be described in response to the case where the cooling capacity is insufficient in one turn.

Figure 7:
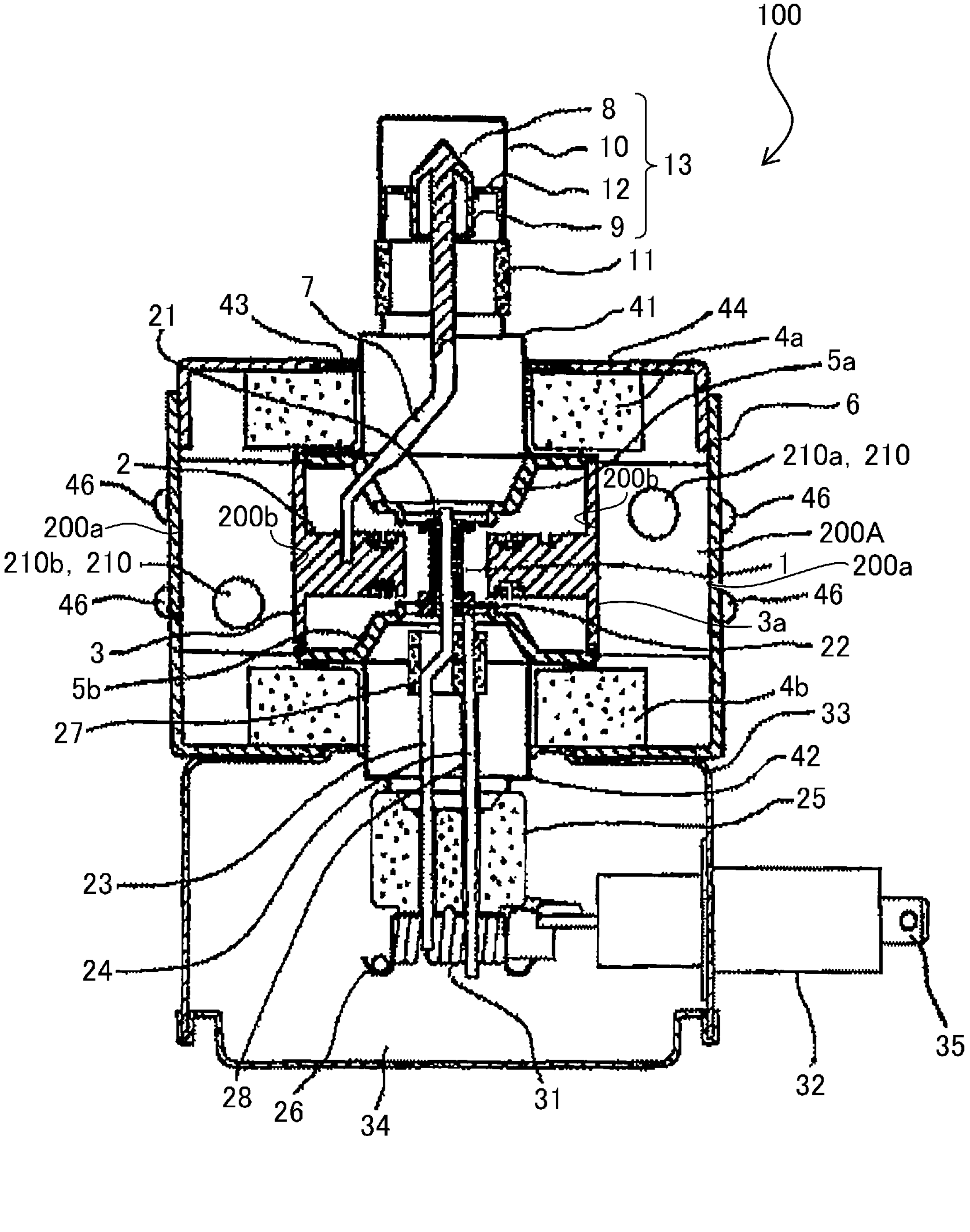
FIG. 7 is a longitudinal cross-sectional view illustrating a configuration of an industrial magnetron according to a second embodiment of the present invention.

FIG. 7 is a longitudinal cross-sectional view illustrating a configuration of an industrial magnetron according to a second embodiment of the present invention. The embodiment is an example applied to an industrial magnetron equipped with a refrigerant path that circulates around an anode cylinder body multiple times. Components that are similar as those in FIG. 1A are denoted by the same reference numerals, and descriptions of overlapping parts will be omitted.

A cooling block 200A of the industrial magnetron 100 illustrated in FIG. 7 includes a refrigerant flow path 210 that circulates around the anode cylinder body 3 multiple times. The refrigerant flow path 210 is a cylindrical flow path with the helical groove 220 on the inner wall surface.

Figure 8:
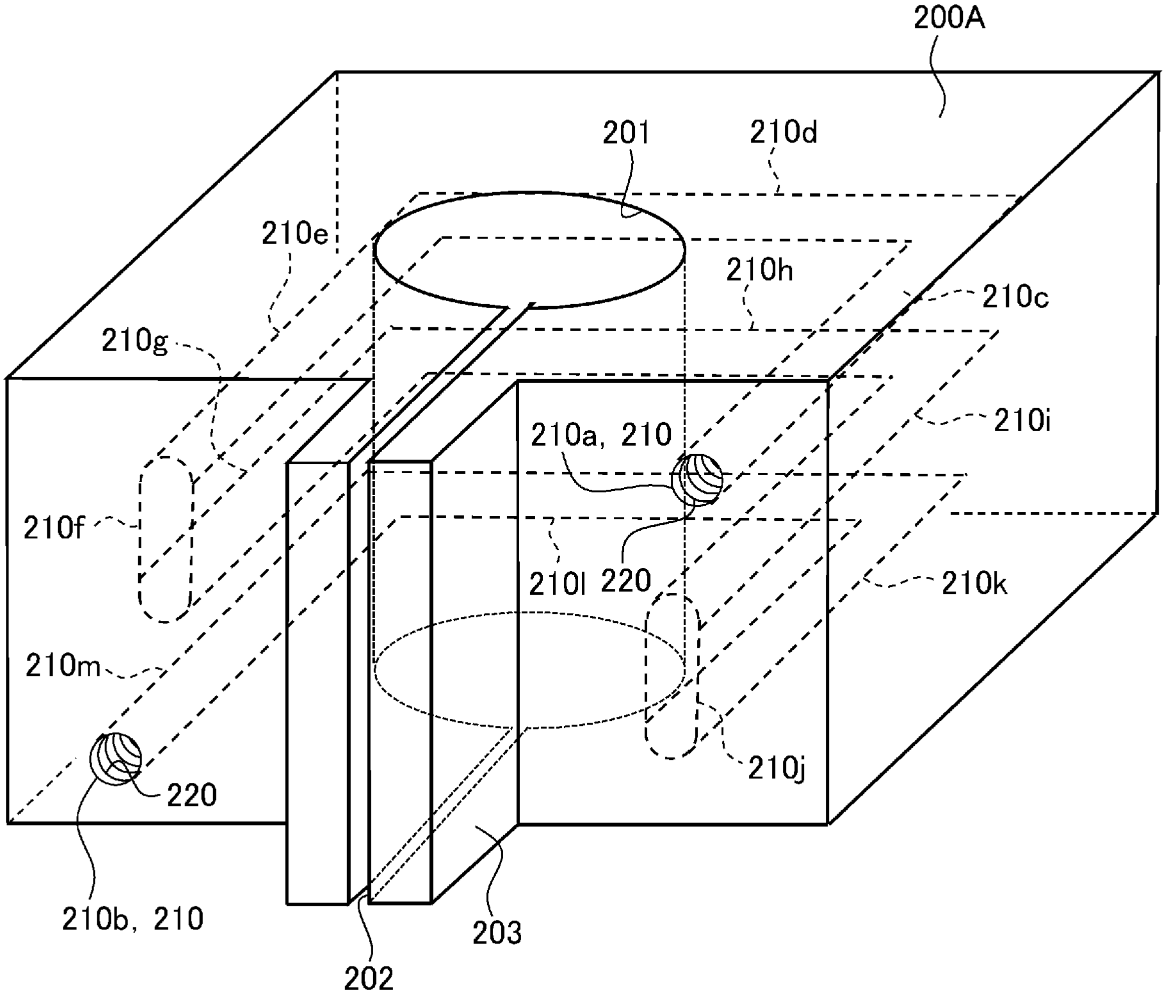
FIG. 8 is a perspective view illustrating a configuration of a cooling block having a refrigerant flow path that circulates around an anode cylinder body of the industrial magnetron multiple times according to the second embodiment of the present invention.

FIG. 8 is a perspective view illustrating a configuration the cooling block 200A having the refrigerant flow path 210 that circulates around the anode cylinder body multiple times. Components that are similar as those in FIG. 2 are denoted by the same reference numerals, and explanations of overlapping parts will be omitted.

As illustrated in FIG. 8, the cooling block 200A has two or more flow paths for circulating the refrigerant at different positions in the vertical direction. The different positions in the vertical direction refer to a vertical positional relationship; a highest position is an upper stage, a lowest position is a lower stage, and an intermediate position is a middle stage.

The cooling block 200A has two or more refrigerant flow paths 210 for circulating the refrigerant at different vertical positions inside the cooling block 200A, and the cooling capacity for the anode cylinder body 3 is adjusted by the position of the refrigerant flow path 210 and/or the number of turns of the refrigerant flow path 210.

The cooling block 200A includes the refrigerant flow path 210 (upper-stage flow paths 210*c*, 210*d*, and 210*e* having the helical groove 220 on the inner wall surface, intermediate flow paths (hereinafter also referred to as "middle-stage flow paths") 210*g*, 210*h*, and 210*i* having the helical groove 220 on the inner wall surface, lower-stage flow paths 210*k*, 210*l*, and 210*m* having the helical groove 220 on the inner wall surface, and connection flow paths 210*f* and 210*j* having the helical groove 220 on the inner wall surface). The three-stage flow path arrangement is configured by the upper-stage flow paths 210*c*, 210*d*, and 210*e*, the middle-stage flow paths 210*g*, 210*h*, and 210*i*, and the lower-stage flow paths 210*k*, 210*l*, and 210*m*.

Inside the cooling block 200A, the upper-stage flow paths 210*c*, 210*d*, and 210*e*, the middle-stage flow paths 210*g*, 210*h*, and 210*i*, and the lower-stage flow paths 210*k*, 210*l*, and 210*m* are provided at different positions (heights) in the vertical direction.

The upper-stage flow paths 210*c*, 210*d*, and 210*e* and the middle-stage flow paths 210*g*, 210*h*, and 210*i* are connected by providing the connection flow path 210*f*, and the middle-stage flow paths 210*g*, 210*h*, and 210*i* and the lower-stage flow paths 210*k*, 210*l*, and 210*m* are connected by providing the connection flow path 210*j*. It is desirable that the connection flow path 210*f* is arranged in the vertical direction so that the upper-stage flow path 210*e* and the middle-stage flow path 210*g* are connected at the shortest distance, that is, the connection flow path 210*f* is perpendicular to both the upper-stage flow path and the middle-stage flow path. Similarly, it is desirable that the connection flow path 210*j* is arranged in the vertical direction so that the middle-stage flow path 210*i* and the lower-stage flow path 210*k* are connected at the shortest distance, that is, the connection flow path 210*j* is perpendicular to both the middle-stage flow path and the lower-stage flow path. However, directions of the connection flow paths 210*f* and 210*j* are not limited thereto, and may be arranged obliquely with respect to the vertical direction.

Therefore, in the cooling block 200A, the upper-stage flow paths 210*c*, 210*d*, and 210*e*, the middle-stage flow paths 210*g*, 210*h*, and 210*i*, and the lower-stage flow paths 210*k*, 201*l*, and 210*m* are connected in series by the connection flow paths 210*f* and 210*j* to form a single flow path.

The upper-stage flow paths 210*c*, 210*d*, and 210*e*, the middle-stage flow paths 210*g*, 210*h*, and 210*i*, and the lower-stage flow paths 210*k*, 201*l*, and 210*m* are formed in a U-shape such that the central axes of the respective flow paths are located on the same horizontal plane. That is, the upper-stage flow paths 210*c*, 210*d*, and 210*e*, the middle-stage flow paths 210*g*, 210*h*, and 210*i*, and the lower-stage flow paths 210*k*, 201*l*, and 210*m* are arranged in a U-shape to circulate around the outer peripheral surface of the anode cylinder body 3 (FIG. 7), and the flow paths are arranged at predetermined intervals in the vertical direction. When looking at the cooling block 200A from above, the upper-stage flow paths 210*c*, 210*d*, and 210*e*, the middle-stage flow paths 210*g*, 210*h*, and 210*i*, and the lower-stage flow paths 210*k*, 201*l*, and 210*m* are preferably arranged so that the U-shapes overlap each other.

The upper-stage flow path 210*c* has the connection port 210*a* as an end (opening portion), and the lower flow path 210*m* has the connection port 210*b* as an end (opening portion). The connection port 210*a* of the upper-stage flow path 210*c* and the connection port 210*b* of the lower-stage flow path 210*m* are arranged on the same side surface of the cooling block 200A. The connection port 210*a* of the upper-stage flow path 210*c* and the connection port 210*b* of the lower-stage flow path 210*m* are used as connection ports for connecting to the external refrigerant storage tank (not illustrated).

As such, in the configuration of the refrigerant flow path 210 that circulates multiple times, it is possible to adjust the cooling capacity for the anode cylinder body 3 by the arrangement position of uppermost-stage refrigerant flow paths (upper-stage flow paths 210*c*, 210*d*, 210*e*), lowermost-stage refrigerant flow paths (lower-stage flow paths 210*k*, 201*l*, 210*m*), and intermediate refrigerant flow paths (middle-stage flow paths 210*g*, 210*h*, 210*i*), or the number of turns of the intermediate refrigerant flow paths (middle-stage flow paths 210*g*, 210*h*, 210*i*).

Processing and Forming of Refrigerant Flow Path 210

Figure 9:
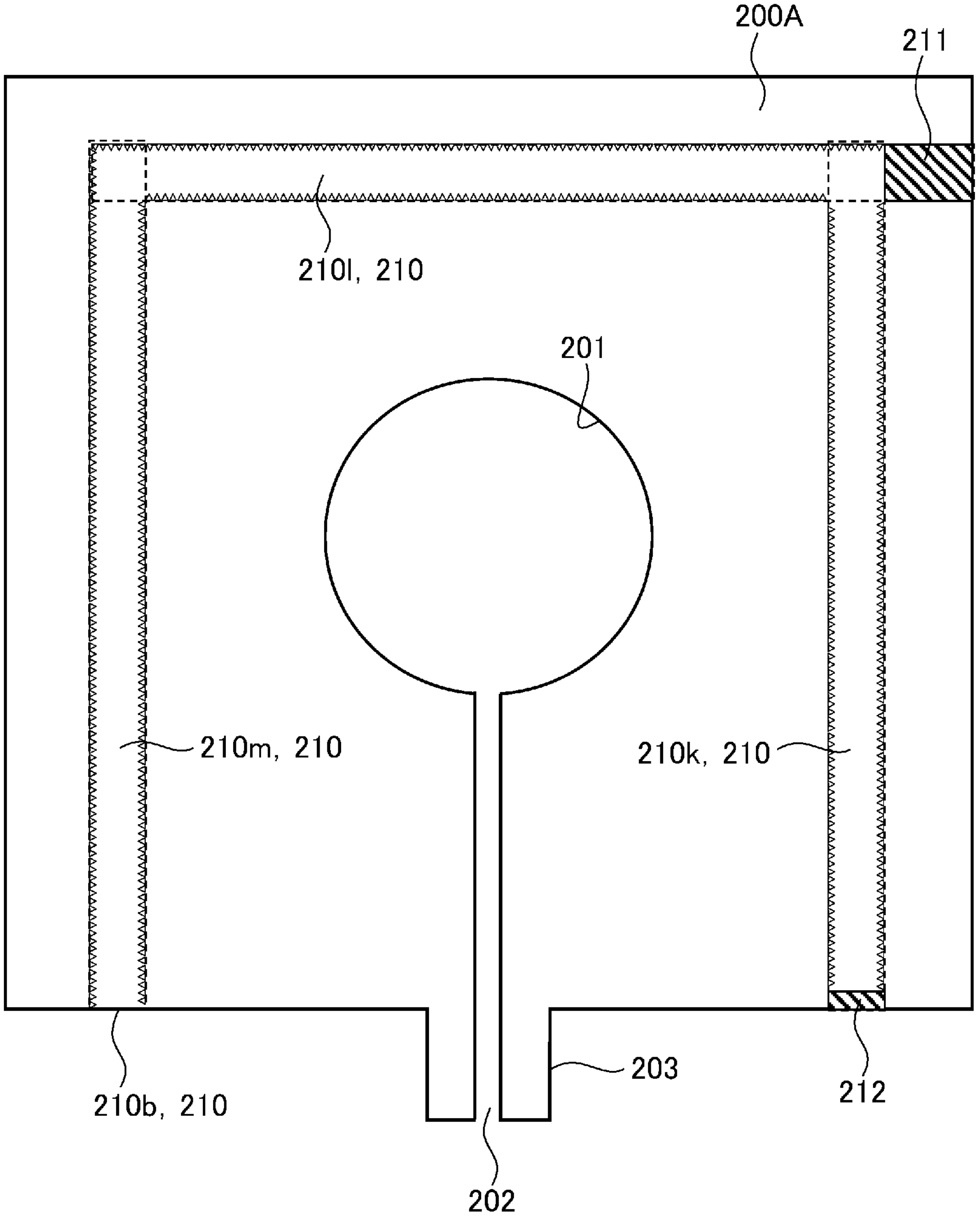
FIG. 9 is a diagram illustrating processing and formation of the refrigerant flow path of the industrial magnetron according to the second embodiment of the present invention.

FIG. 9 is a diagram illustrating processing and forming of the refrigerant flow path 210. FIG. 9 takes as an example the processing and forming of the lower-stage flow paths 210*k*, 201*l*, and 210*m* among the upper-stage flow paths 210*c*, 210*d*, and 210*e*, the middle-stage flow paths 210*g*, 210*h*, and 210*i*, the lower-stage flow paths 210*k*, 201*l*, and 210*m*, and the connection flow paths 210*f* and 210*j* in FIG. 8.

A tapping drill (drill for helical groove machining) that corresponds to the pitch, inner diameter, and nominal diameter (FIG. 3) of the refrigerant flow path necessary to secure the necessary cooling capacity is prepared.

In forming the lower-stage flow paths 210*k*, 201*l*, and 210*m*, cutting is first performed using the tapping drill from one side surface of the cooling block 200A (lower-stage flow path 210*m*). Here, cutting is performed so that a tip of the tapping drill does not penetrate a side surface opposite to the corresponding side surface. The intervals between the lower-stage flow paths 210*k*, 201*l*, and 210*m* are appropriately set considering the heat generation amount of the anode cylinder body 3 or the like at the design stage.

Next, cutting is similarly performed at a predetermined position (at the same height in the vertical direction) on a side surface (side surface perpendicular thereto) adjacent to the relevant side surface (lower-stage flow path 201*l*). Here, cutting is performed so that the lower-stage flow path 201*l* is connected to an innermost part of the lower-stage flow path 210*m*. Here, the lower-stage flow path 201*l* is connected to the lower-stage flow path 210*m* from near an entrance.

Next, the lower-stage flow path 210*k* is cut to be connected from a vicinity of an entrance to an innermost part of the lower-stage flow path 201*l*. Here, the lower-stage flow path 210*k* is connected to the lower-stage flow path 201*l* from near the entrance.

By the above-described processing, the lower-stage flow paths 210*k*, 201*l*, and 210*m* are communicated with each other, and a U-shaped flow path is formed.

Next, the connection flow path 210*j* (FIG. 8) is formed from a bottom surface of the cooling block 200A by cutting using the tapping drill. As a result, the middle-stage flow paths 210*g*, 210*h*, and 210*i* communicate with the lower-stage flow paths 210*k*, 201*l*, and 210*m*.

Here, helical groove processing is already completed for the upper-stage flow paths 210*c*, 210*d*, and 210*e* and the middle-stage flow paths 210*g*, 210*h*, and 210*i* by cutting using a similar tapping drill. For example, in forming the upper-stage flow path 210*e*, first, cutting is performed using the tapping drill from one side surface (back surface) of the cooling block 200A (upper-stage flow path 210*e*). Cutting is similarly performed at a predetermined position (at the same height in the vertical direction) on a side surface (side surface perpendicular thereto) adjacent to the relevant side surface (upper-stage flow path 210*d*). The connection flow path 210*f* communicating with an innermost part of the upper-stage flow path 210*e* is formed by cutting from an upper surface of the cooling block 200A using the tapping drill. Opening portions formed by cutting using the tapping drill when opening the upper-stage flow path 210*e*, upper-stage flow path 210*d*, and connection flow path 210*f* are closed by closing members (not illustrated).

The intervals between the upper-stage flow paths 210*c*, 210*d*, and 210*e*, the middle-stage flow path 210*g*, 210*h*, and 210*i*, and the lower-stage flow paths 210*k*, 201*l*, and 210*m* are appropriately set considering the heat generation amount of the anode cylinder body 3 or the like at the design stage.

Finally, termination processing is performed in which the opening portions other than the connection port 210*b* for introducing the refrigerant and the connection port (not illustrated) for recovering the refrigerant are closed by closing members 211 and 212. It is preferable that the closing members 211 and 212 use screw members for embedding the closing members 211 and 212 to appropriate positions. Specifically, it is desirable that the closing members 211 and 212 use a sinking plug, and by using the sinking plug wrapped with seal tape, leakage can be prevented even when the pressure of the refrigerant is high, and thus a highly reliable product can be obtained. By using the sinking plug, when foreign matter or the like remains in the flow path of the cooling block 200A and the flow path resistance increases, it becomes easy to remove the sink plug and clean the inside of the flow path. However, it is also possible to fix the closing members 211 and 212 by welding. This is because welding can more reliably prevent liquid leakage.

The above-described processing and assembly methods have been described for the case of a three-stage flow path configuration, but the same applies to the case of a single-stage flow path configuration, a two-stage flow path configuration, and a flow path configuration of four or more stages.

Refrigerant Flow

Figure 10:
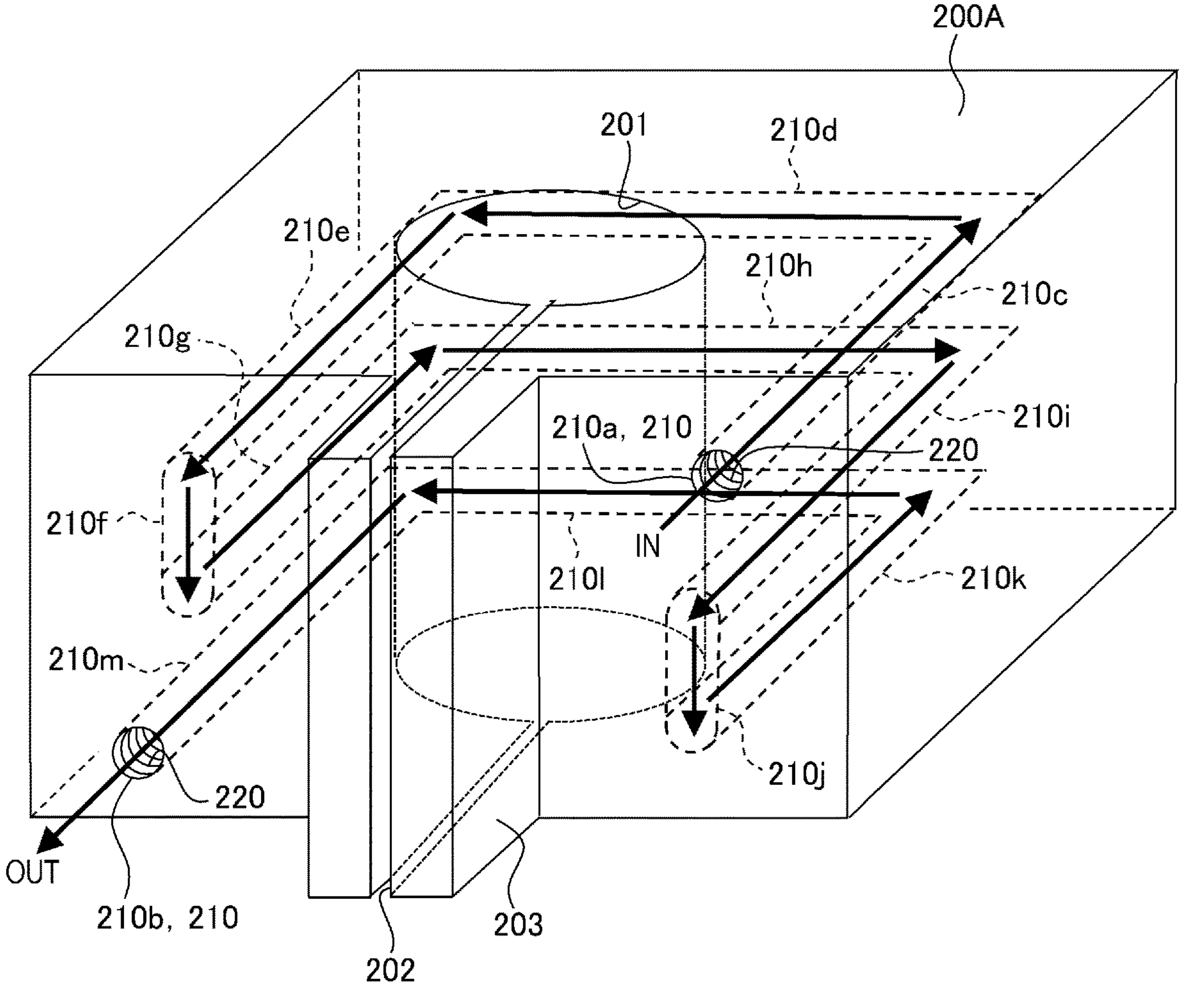
FIG. 10 is a perspective view illustrating flow of refrigerant in the cooling block having a three-stage flow path configuration of FIG. 8.

FIG. 10 is a perspective view illustrating flow of refrigerant in the cooling block having the three-stage flow path configuration illustrated in FIG. 8. The thick arrows in FIG. 10 represent the flow of refrigerant.

As illustrated in FIG. 10, processing is performed in which the refrigerant introduced from the refrigerant storage tank (not illustrated) through a refrigerant supply path (not illustrated) and the connection port 210*a* (inlet) of the upper-stage flow path 210*c* is transferred to the middle-stage flow paths 210*g*, 210*h*, and 210*i* through the connection flow path 210*f* after cooling the anode cylinder body 3 (FIG. 7) inside the magnetron body through the upper-stage flow paths 210*c*, 210*d*, and 210*e*, and then the refrigerant is transferred to the lower-stage flow paths 210*k*, 201*l*, and 210*m* through the connection flow path 210*j* after cooling the anode cylinder body 3 through the middle-stage flow paths 210*g*, 210*h*, and 210*i*, and then the refrigerant is recovered into the refrigerant storage tank via the connection port 210*b* (discharge port) of the lower-stage flow path 210*m* and a refrigerant recovery flow path after cooling the anode cylinder body 3 through the lower-stage flow paths 210*k*, 201*l*, and 210*m*. This is regarded as one cooling processing, and the cooling processing is repeated.

The refrigerant is introduced from the connection port 210*a* of the upper-stage flow path 210*c* and passes through the U-shaped upper-stage flow paths 210*c*, 210*d*, and 210*e*, then the refrigerant flows into the middle-stage flow path 210*g* via the connection flow path 210*f* and passes through the U-shaped middle-stage flow paths 210*g*, 210*h*, and 210*i*, then the refrigerant further flows into the lower-stage flow path 210*k* via the connection flow path 210*j* and passes through the U-shaped lower-stage flow paths 210*k*, 201*l*, and 210*m*, and then the refrigerant exits from the connection port 210*b* in the lower-stage flow path 210*m*.

In FIG. 10, first, the refrigerant circulates around the anode cylinder body 3 through the upper-stage flow paths 210*c*, 210*d*, and 210*e* and cools the anode cylinder body 3, then the refrigerant affected by the heat of the anode cylinder body 3 is transferred to the middle-stage flow paths 210*g*, 210*h*, and 210*i*, circulates around the anode cylinder body 3 through the middle-stage flow paths 210*g*, 210*h*, and 210*i*, and cools the anode cylinder body 3, and then the refrigerant further affected by the heat of the anode cylinder body 3 circulates around the anode cylinder body 3 through the lower-stage flow paths 210*k*, 201*l*, and 210*m*, and cools the anode cylinder body 3. Thus, the refrigerant can be circulated around the anode cylinder body 3 through each cooling flow path at a predetermined discharge pressure.

Adjustment of Refrigerant Capacity of Cooling Block 200A with Refrigerant Flow Path that Circulates Around Multiple Times Basically, by arranging the refrigerant flow path 210 to circulate around the part of the anode cylinder body 3 that generates the largest amount of heat, the cooling capacity of the refrigerant flow path 210 relative to the anode cylinder body 3 is adjusted to be maximized.

As described above, as similar to the cooling block 200 of FIG. 2, the refrigerant capacity of the cooling block 200A can be adjusted by either one of:

(1) Cross-sectional area of refrigerant flow path, (2) Pitch, inner diameter, and nominal diameter of helical groove, (3) Arrangement position of refrigerant flow path, or (4) Number of turns of refrigerant flow path, or a combination thereof.

When the conditions of the tapping drill are not changed, the refrigerant capacity can be adjusted by (3) Arrangement position of refrigerant flow path and (4) Number of turns of the refrigerant flow path. Below, the adjustment methods will be described in order.

FIGS. 11A to 11F are diagrams schematically illustrating the arrangement positions of the refrigerant flow path that circulates multiple times.

Figure 11A:
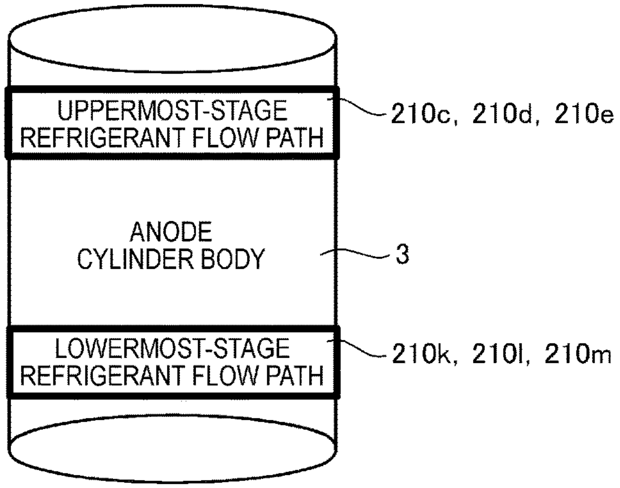
FIG. 11A is a diagram schematically illustrating an arrangement position of a refrigerant flow path in that the industrial magnetron circulates multiple times according to the second embodiment of the present invention.

In FIG. 11A, the maximum heat generation part is distributed in the upper and lower portions of the anode cylinder body 3. Therefore, the uppermost-stage refrigerant flow path (for example, the upper-stage flow paths 210*c*, 210*d*, and 210*e* in FIG. 8) and the lowermost-stage refrigerant flow path (for example, the lower-stage flow paths 210*k*, 201*l*, and 210*m* in FIG. 8) are made to circulate around the upper and lower portions of the anode cylinder body 3. Here, it is a two-stage flow path configuration.

Figure 11B:
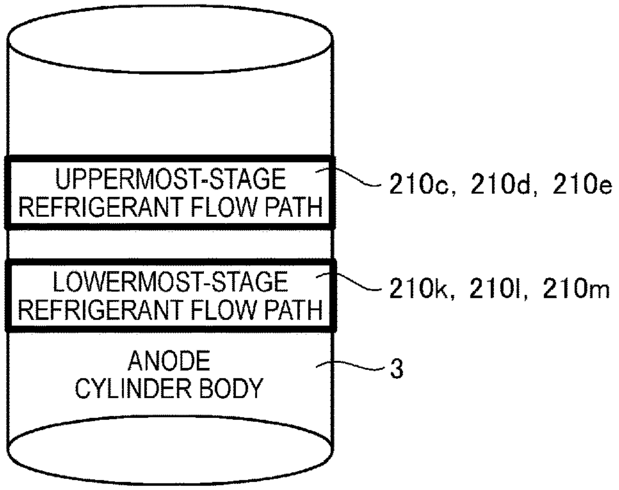
FIG. 11B is a diagram schematically illustrating an arrangement position of the refrigerant flow path in that the industrial magnetron circulates multiple times according to the second embodiment of the present invention.

In FIG. 11B, the maximum heat generation part is distributed in the center of the anode cylinder body 3. Therefore, the uppermost-stage refrigerant flow path (for example, the upper-stage flow paths 210*c*, 210*d*, and 210*e* in FIG. 8) and the lowermost-stage refrigerant flow path (for example, the lower-stage flow paths 210*k*, 201*l*, and 210*m* in FIG. 8) are made to circulate around the center of the anode cylinder body 3. Here, it is a two-stage flow path configuration.

Figure 11C:
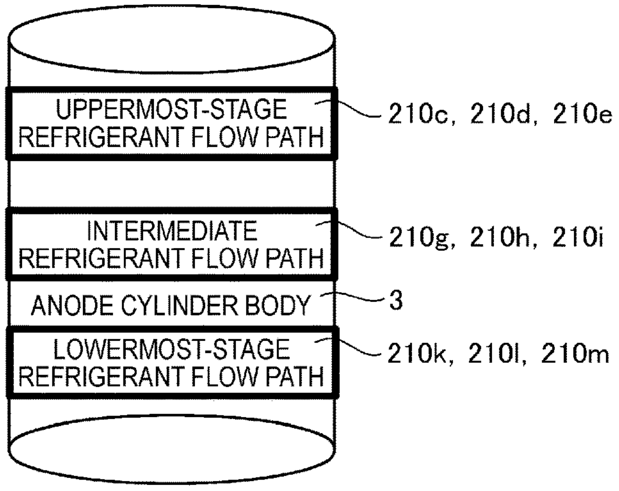
FIG. 11C is a diagram schematically illustrating an arrangement position of the refrigerant flow path in that the industrial magnetron circulates multiple times according to the second embodiment of the present invention.

In FIG. 11C, the maximum heat generation part is distributed in the center of the anode cylinder body 3, and it is a high output type. Therefore, it is a three-stage flow path configuration corresponding to the heat generation amount of the high output type, and has the uppermost-stage refrigerant flow path (for example, the upper-stage flow paths 210*c*, 210*d*, and 210*e* in FIG. 8), the intermediate refrigerant flow path (for example, the middle-stage flow path 210*g*, 210*h*, and 210*i* in FIG. 8), and the lowermost-stage refrigerant flow path (for example, the lower-stage flow paths 210*k*, 201*l*, and 210*m* in FIG. 8) circulating around the center of the anode cylinder body 3.

Figure 11D:
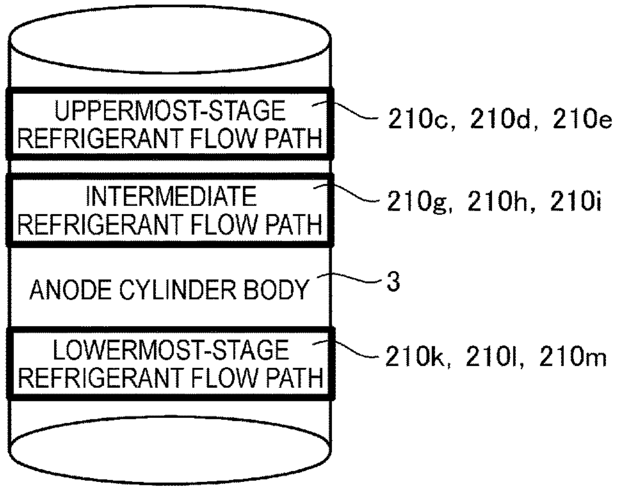
FIG. 11D is a diagram schematically illustrating an arrangement position of the refrigerant flow path in that the industrial magnetron circulates multiple times according to the second embodiment of the present invention.

In FIG. 11D, the maximum heat generating part is distributed in the upper portion of the anode cylinder body 3, and it is a high output type. It is a three-stage flow path configuration that corresponds to the heat generation amount of the high output type. Therefore, the middle refrigerant flow path (for example, the middle-stage flow paths 210*g*, 210*h*, and 210*i* in FIG. 8) is arranged close to the uppermost-stage refrigerant flow path (for example, the upper-stage flow paths 210*c*, 210*d*, and 210*e* in FIG. 8), and the uppermost-stage refrigerant flow path (for example, the upper-stage flow paths 210*c*, 210*d*, and 210*e* in FIG. 8), the intermediate refrigerant flow path (for example, the middle-stage flow paths 210*g*, 210*h*, and 210*i* in FIG. 8), and the lowermost-stage refrigerant flow path (for example, the lower-stage flow paths 210*k*, 201*l*, and 210*m* in FIG. 8) are made to circulate around the anode cylinder body 3.

Figure 11E:
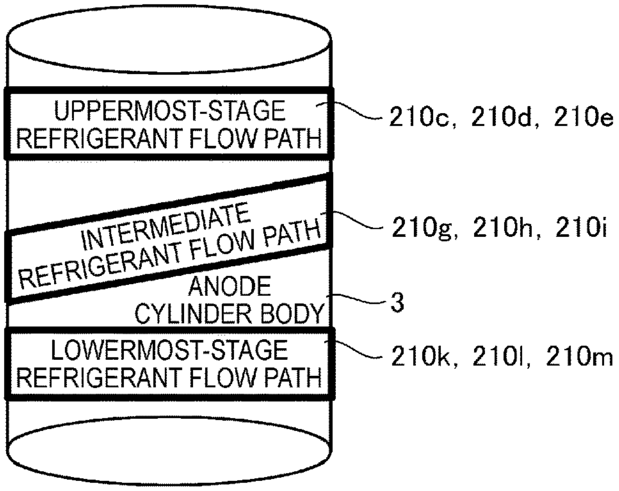
FIG. 11E is a diagram schematically illustrating an arrangement position of the refrigerant flow path in that the industrial magnetron circulates multiple times according to the second embodiment of the present invention.

FIG. 11E illustrates a three-stage flow path configuration that corresponds to the amount of heat generated by a high output type. The difference from FIG. 11C is that the middle-stage flow paths 210*g*, 210*h*, and 210*i* in FIG. 11E obliquely circulate around the center of the anode cylinder body 3. In forming the middle-stage flow paths 210*g*, 210*h*, and 210*i* in FIG. 11E, cutting is performed diagonally from one side surface of the cooling block 200A using the tapping drill. Therefore, the middle-stage flow paths 210*g*, 210*h*, and 210*i* in FIG. 11E are connected to the uppermost-stage refrigerant flow path (for example, the upper-stage flow paths 210*c*, 210*d*, and 210*e* in FIG. 8) and the lowermost-stage refrigerant flow path (for example, the lower-stage flow paths 210*k*, 201*l*, and 210*m* in FIG. 8) by circulating around the anode cylinder body 3 in a spiral manner.

By adopting a configuration in which the middle-stage flow paths 210*g*, 210*h*, and 210*i* circulate diagonally, it is possible to correspond to the heat generation amount of a high output type without increasing the number of stages of the refrigerant flow path.

Figure 11F:
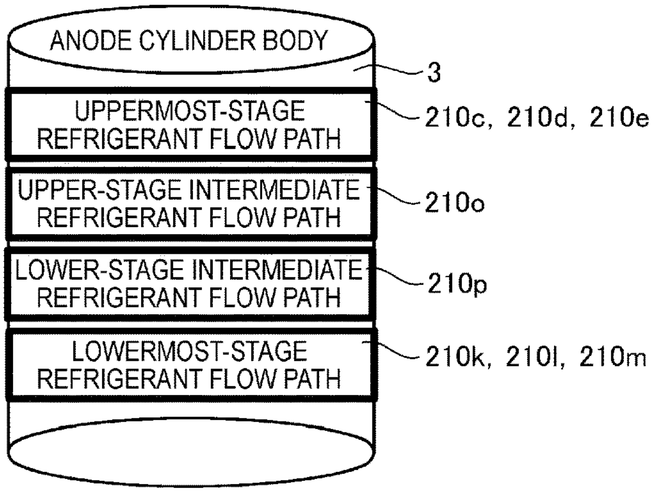
FIG. 11F is a diagram schematically illustrating an arrangement position of the refrigerant flow path in that the industrial magnetron circulates multiple times according to the second embodiment of the present invention.

FIG. 11F illustrates a four-stage flow path configuration corresponding to the heat generation amount of a high output type. The intermediate refrigerant flow path is provided in two stages, that is, an upper-stage intermediate refrigerant flow path 210*o* and a lower-stage intermediate refrigerant flow path 210*p*. The uppermost-stage refrigerant flow path (for example, the upper-stage flow paths 210*c*, 210*d*, and 210*e* in FIG. 8), the upper-stage intermediate refrigerant flow path 210*o*, the lower-stage intermediate refrigerant flow path 210*p*, and the lowermost-stage refrigerant flow path (for example, the lower-stage flow paths 210*k*, 201*l*, and 210*m* in FIG. 8) are circulated around the anode cylinder body 3.

Effects of Second Embodiment

In the industrial magnetron 100 (FIGS. 7 to 10) according to the second embodiment, the cooling block 200A (FIG. 8) has two or more refrigerant flow paths 210 for circulating a refrigerant at different positions in the vertical direction, and the cooling capacity for the anode cylinder body 3 is adjusted by the position of the refrigerant flow path 210 and/or the number of turns of the refrigerant flow path 210.

As in the first embodiment, in the sample product manufacturing stage before the actual production of the industrial magnetron 100, the industrial magnetron 100 is test-operated to specify the heat generation position of the anode cylinder body 3 and measure the heat generation amount, and then the pitch, inner diameter, and nominal diameter of the helical groove 220, the arrangement position of the refrigerant flow path 210, and the number of turns of the refrigerant flow path 210 are set according to the heat generation position and the amount of heat generated.

As such, by having the helical groove 220 in the refrigerant flow path 210, it is possible to increase the cooling capacity even when the amount of refrigerant supplied per unit time is the same. The cooling block 200A is equipped with two or more refrigerant flow paths 210 with excellent cooling capacity, so even when the amount of heat generated by the anode cylinder body 3 increases, it is possible to sufficiently cool the anode cylinder body 3 and prevent performance degradation and failure of the anode cylinder body 3. As a result, it is possible to provide an industrial magnetron that suppresses the effects of heat generation even when operated in a high output range of 2 kW to 15 kW.

From another point of view, the refrigerant flow path 210 having the helical groove 220 has excellent cooling ability. Thus, depending on the output of the industrial magnetron, there is a possibility that the refrigerant flow path 210 can be provided in a single circulation configuration (first embodiment; FIGS. 1A and 2) even at high outputs. For example, the refrigerant flow path of the related art requires two or more refrigerant flow paths due to high output, whereas in the case of the present invention, there is an advantage that only one circulation configuration is required, or that the number of stages of the refrigerant flow path can be reduced compared to the case where two or more refrigerant flow paths are required due to high output. As an additional effect, the refrigerant flow path 210 having the helical groove 220 has excellent cooling capacity, so by carefully arranging the refrigerant flow path, it is possible to reduce the number of stages of the refrigerant flow path while managing the heat generation amount. When the number of stages of the refrigerant flow path is small, the configuration of the cooling block is simplified, and thus manufacturing costs and maintenance can be expected to be reduced.

Regardless of the type of output of the industrial magnetron, in the sample product manufacturing stage before the actual production of the industrial magnetron 100, the industrial magnetron 100 is test-operated to specify the heat generation position of the anode cylinder body 3 and measure the heat generation amount, and then the pitch, inner diameter, and nominal diameter of the helical groove 220, the arrangement position of the refrigerant flow path 210, and the number of turns of the refrigerant flow path 210 are set according to the heat generation position and the heat generation amount. Therefore, it is possible to cope with future output changes, changes in application conditions, and replacements, and thus versatility can be greatly improved.

In the industrial magnetron 100 (FIGS. 7 to 10) according to the second embodiment, the cooling block 200A has two or more refrigerant flow paths 210 for circulating the refrigerant at different positions in the vertical direction, and the two or more refrigerant flow paths 210 are connected to each other by the connection flow paths 210*f* and 210*j* that have the helical grooves 220 on the inner wall surfaces.

Accordingly, the two or more refrigerant flow paths 210 and connection flow paths 210*f* and 210*j* are all formed by cutting using the tapping drill. The two or more refrigerant flow paths 210 can be connected in series by the connection flow paths 210*f* and 210*j* to form a single flow path. From a manufacturing standpoint, it is desirable that the refrigerant flow path and the connection flow path are orthogonal.

In the industrial magnetron 100 (FIGS. 7 to 10) according to the second embodiment, the cooling block 200A has two or more refrigerant flow paths 210 for circulating the refrigerant at different vertical positions. When the flow path located at the top in the vertical direction is called an upper-stage flow path and the flow path located at the bottom in the vertical direction is called a lower-stage flow path among the two or more refrigerant flow paths 210, the connection ports 210*a* and 210*b* are respectively provided at one ends of the upper-stage flow path and the lower-stage flow path, and the refrigerant is introduced from the connection port 210*a* of the upper-stage flow path and discharged from the connection port 210*b* of the lower-stage flow path, or the refrigerant is introduced from the connection port 210*b* of the lower-stage flow path and discharged from the connection port 210*a* of the upper-stage flow path.

Accordingly, the refrigerant supply path (not illustrated) and the refrigerant storage tank (not illustrated) can be connected to the connection ports 210*a* and 210*b*. For example, the refrigerant supplied from the refrigerant storage tank (not illustrated) via the refrigerant supply path (not illustrated) can be introduced into the connection port 210*a* (inlet). The refrigerant can be recovered to the refrigerant storage tank via the connection port 210*b* (discharge port) and the refrigerant recovery flow path.

In the industrial magnetron 100 (FIGS. 7 to 10) according to the second embodiment, the cooling block 200A includes the intermediate flow path (for example, the middle-stage flow paths 210*g*, 210*h*, and 210*i* in FIG. 8) arranged at a vertically intermediate position between the upper-stage flow path and the lower-stage flow path, and the cooling capacity for the anode cylinder body 3 is adjusted by the position of the intermediate flow path and/or the number of intermediate flow paths.

Accordingly, by providing the intermediate flow path, one flow path can be configured with three or more stages of refrigerant flow paths (for example, see FIG. 11C). By providing the intermediate flow path, the degree of freedom is increased related to the arrangement position of the intermediate flow path for the heat generating portion, as illustrated in FIGS. 11C to 11F, for example. By making the intermediate flow path correspond to the heat generating portion, it is possible to cope with the heat generation amount while reducing the number of stages in the refrigerant flow path. As a result, even when the amount of heat generated by the anode cylinder body 3 becomes larger, it is possible to sufficiently cool the anode cylinder body 3 and prevent performance deterioration and failure of the anode cylinder body.

In the industrial magnetron 100 (FIGS. 7 to 10) according to the second embodiment, regarding the intermediate flow path, when the intermediate flow path located at the upper portion in the vertical direction is called the upper-stage intermediate flow path and the intermediate flow path located at the lower portion in the vertical direction is called the lower-stage intermediate flow path, the upper-stage intermediate flow path and the lower-stage intermediate flow path are arranged at different positions to not be directly connected, and are connected by the connection flow paths 210*f* and 210*j* after circulating around the anode cylinder body 3.

Accordingly, by arranging the upper-stage intermediate flow path and the lower-stage intermediate flow path at different positions not to be directly connected, when the refrigerant affected by the heat of the anode cylinder body 3 is transferred to the intermediate flow path, the anode cylinder body 3 can be cooled by circulating around the anode cylinder body 3 all over, and thus the cooling effect can be enhanced.

In the industrial magnetron 100 (FIGS. 7 to 10) according to the second embodiment, the intermediate flow path is an oblique flow path that connects the upper-stage flow path and the lower-stage flow path by circulating around the anode cylinder body 3 in a spiral manner.

Accordingly, for example, as illustrated in FIG. 11E, the intermediate flow path can be made to correspond to the heat generation portion, and the heat generation amount can be coped with while reducing the number of stages of the refrigerant flow path.

In the industrial magnetron 100 (FIGS. 7 to 10) according to the second embodiment, the columnar shape of the cooling block 200A is a rectangular column. The upper-stage flow path, the lower-stage flow path, and the intermediate flow path are formed in a U-shape from a predetermined surface of the rectangular column and circulate around the anode cylinder body 3. The ends of the upper-stage flow path and the lower-stage flow path are closed by ends different from the connection ports 210*a* and 210*b*, and both ends of the intermediate flow path are closed.

Accordingly, by making the columnar shape of the cooling block into a rectangular column, manufacturing including processing such as drilling is facilitated. The rectangular column is highly compatible when forming a refrigerant flow path in a U-shape. The U-shaped refrigerant flow path can be easily processed into a helical groove by cutting using the tapping drill. Therefore, manufacturing costs can be reduced.

The present invention is not limited to the configurations described in each of the above embodiments, and the configurations can be changed as appropriate without departing from the gist of the present invention as described in the claims.

For example, the arrangement position, number of stages, and shape of the refrigerant flow path, position of the connection ports, and the like are only examples, and any arrangement may be applied.

The embodiments described above have been described in detail to explain the present invention in an easy-to-understand manner, and are not necessarily limited to those having all the configurations described. It is possible to replace a part of the configuration of one embodiment with the configuration of another embodiment, and it is also possible to add the configuration of another embodiment to the configuration of one embodiment. It is possible to add, delete, or replace some of the configurations of each embodiment with other configurations.

What is claimed is:

1. An industrial magnetron that includes an anode cylinder body and a cooling block arranged in a columnar manner around an outer periphery of the anode cylinder body, wherein the cooling block is provided with, a refrigerant flow path that circulates a liquid refrigerant to circulate around the anode cylinder body and directly cool the anode cylinder body, the refrigerant flow path has, a helical groove on an inner wall surface, and in a sample product manufacturing stage prior to actual production, a test operation is performed to specify a heat generation position of the anode cylinder body and measure a heat generation amount, and then pitch, inner diameter, and nominal diameter of the helical groove, an arrangement position of the refrigerant flow path, and the number of turns of the refrigerant flow path are set according to the heat generation position and the heat generation amount.

2. The industrial magnetron according to claim 1, wherein the cooling block has, the refrigerant flow path that circulates around the anode cylinder body at least once, and a position at which the refrigerant flow path circulates around the anode cylinder body is set according to the heat generation position and the heat generation amount obtained by performing the test operation to specify the heat generation position of the anode cylinder body and measure the heat generation amount.

3. The industrial magnetron according to claim 1, wherein the cooling block has, two or more refrigerant flow paths that allow the refrigerant to flow at different positions in a vertical direction, and a position where the refrigerant flow path is arranged and/or the number of turns of the refrigerant flow path are set according to the heat generation position and the heat generation amount obtained by performing the test operation to specify the heat generation position of the anode cylinder body and measure the heat generation amount.

4. The industrial magnetron according to claim 1, wherein the cooling block has, two or more refrigerant flow paths that allow the refrigerant to flow at different positions in a vertical direction, and the two or more of the refrigerant flow paths are connected to each other by a connection flow path having a helical groove on an inner wall surface.

5. The industrial magnetron according to claim 4, wherein the cooling block has, two or more refrigerant flow paths that allow the refrigerant to flow at different positions in the vertical direction, when a flow path located at a top in the vertical direction is called an upper-stage flow path and a flow path located at a bottom in the vertical direction is called a lower-stage flow path among the two or more refrigerant flow paths, a connection port is provided at one end of each of the upper-stage flow path and the lower-stage flow path, and the refrigerant is introduced from the connection port of the upper-stage flow path and discharged from the connection port of the lower-stage flow path, or the refrigerant is introduced from the connection port of the lower-stage flow path and discharged from the connection port of the upper-stage flow path.

6. The industrial magnetron according to claim 5, wherein the cooling block includes, an intermediate flow path located at a vertically intermediate position between the upper-stage flow path and the lower-stage flow path, and a position where the intermediate flow path is arranged and/or the number of intermediate flow paths arranged are set according to the heat generation position and the heat generation amount obtained by performing the test operation to specify the heat generation position of the anode cylinder body and measure the heat generation amount.

7. The industrial magnetron according to claim 6, wherein regarding the intermediate flow path, when an intermediate flow path located at an upper portion in the vertical direction is called an upper-stage intermediate flow path and an intermediate flow path located at a lower portion in the vertical direction is called a lower-stage intermediate flow path, the upper-stage intermediate flow path and the lower-stage intermediate flow path are arranged at different positions not to be directly connected, and are connected by the connection flow path after circulating around the anode cylinder body.

8. The industrial magnetron according to claim 6, wherein the intermediate flow path is an oblique flow path that connects the upper-stage flow path and the lower-stage flow path by circulating around the anode cylinder body in a spiral manner.

9. The industrial magnetron according to claim 6, wherein a columnar shape of the cooling block is a rectangular column, and the upper-stage flow path, the lower-stage flow path, and the intermediate flow path are formed in a U-shape from a predetermined surface of the rectangular column and circulate around the anode cylinder body, the ends of the upper-stage flow path and the lower-stage flow path are closed by an end different from the connection port, and both ends of the intermediate flow path are closed.

* * * * *